United States Patent
Paramonoff et al.

(10) Patent No.: US 6,848,662 B2
(45) Date of Patent: Feb. 1, 2005

(54) SECURE LATCHING SYSTEM

(75) Inventors: Alexander Paramonoff, North Vancouver (CA); Thomas Michael Zevin, Canoga Park, CA (US); Joe Dufrain Rodriguez, Alta Loma, CA (US)

(73) Assignee: ZIH Corp., Hamilton (BM)

( * ) Notice: Subject to any disclaimer, the term of this patent is extended or adjusted under 35 U.S.C. 154(b) by 0 days.

(21) Appl. No.: 10/056,709

(22) Filed: Jan. 24, 2002

(65) Prior Publication Data

US 2003/0136889 A1 Jul. 24, 2003

(51) Int. Cl.[7] ................................................. A47F 5/00
(52) U.S. Cl. ............... 248/309.1; 248/689; 248/222.11; 361/686
(58) Field of Search ................................ 248/309.1, 314, 248/689, 671, 316.1, 316.5, 222.11, 221.11; 361/686, 683, 726, 725, 724

(56) References Cited

U.S. PATENT DOCUMENTS

| | | | | |
|---|---|---|---|---|
| 5,230,016 A | * | 7/1993 | Yasuda | 455/573 |
| 5,480,115 A | * | 1/1996 | Haltof | 248/221.1 |
| 5,627,727 A | * | 5/1997 | Aguilera et al. | 361/686 |
| 5,825,874 A | * | 10/1998 | Humphreys et al. | 379/446 |
| 5,832,082 A | * | 11/1998 | Nagai | 379/449 |
| 5,898,775 A | * | 4/1999 | Niemo et al. | 379/446 |
| 6,002,921 A | * | 12/1999 | Pfahlert et al. | 455/90 |
| 6,095,470 A | * | 8/2000 | Kalis | 248/309.1 |
| 6,185,302 B1 | * | 2/2001 | Rytkonen et al. | 379/446 |
| 6,438,229 B1 | * | 8/2002 | Overy et al. | 379/446 |

* cited by examiner

Primary Examiner—Gwendolyn Baxter
(74) Attorney, Agent, or Firm—Alston & Bird LLP

(57) ABSTRACT

The disclosed system for securely latching a device in a support frame employs a pair of latching members each adapted to pivot about a latch pivot axis defined on an exterior side of the support frame and are adapted to engage a corresponding latch recess on the device downstream from the first latch pivot axis. The first and second latching members pivot toward the interior of the support frame to securely engage the respective first and second latch recesses and automatically pivot further toward the interior of the support frame within the engaged first and second latch recesses in case of an unplanned attempt to release the device from the support frame.

13 Claims, 4 Drawing Sheets

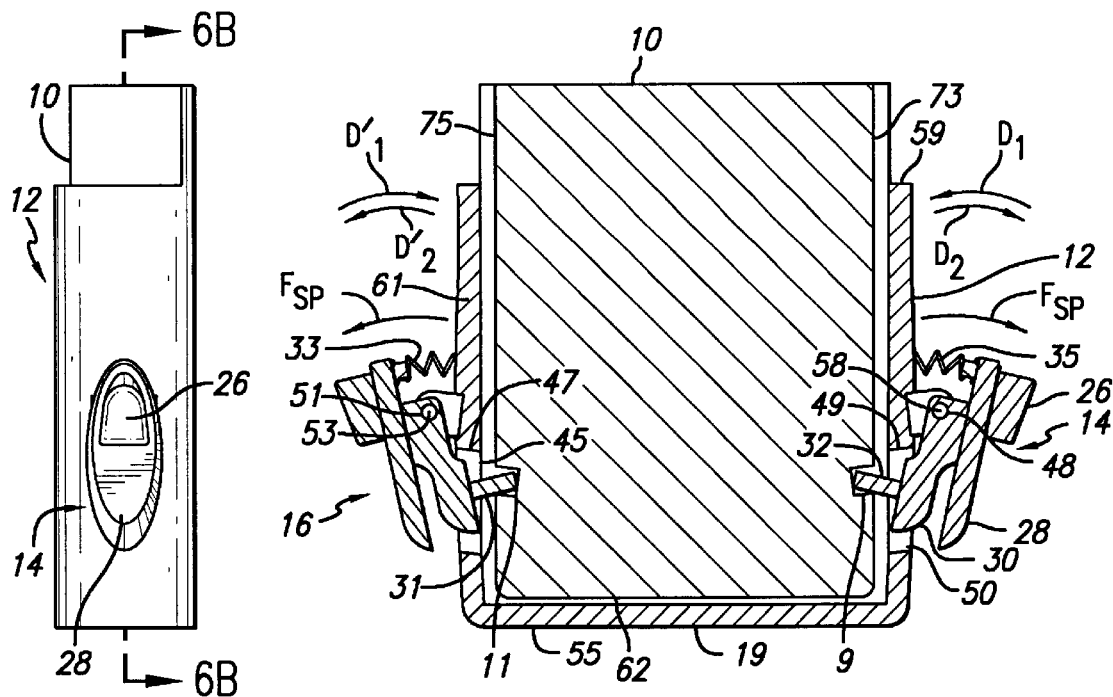
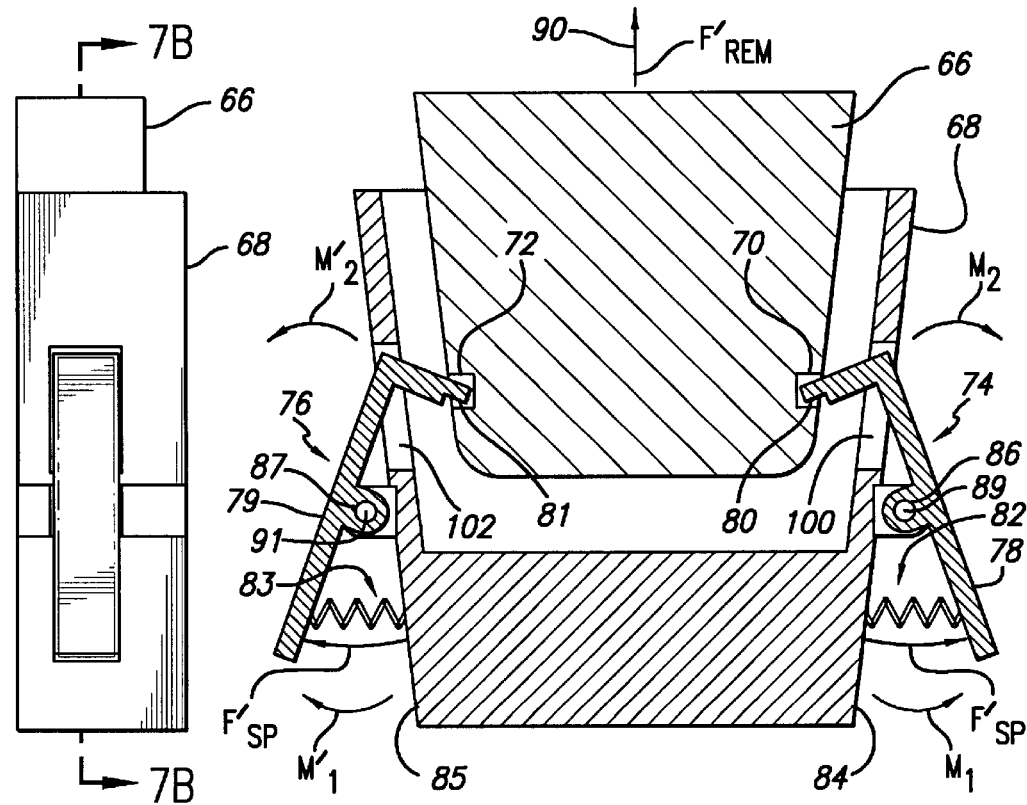
FIG. 6A
FIG. 6B
FIG. 7A
PRIOR ART
FIG. 7B
PRIOR ART

SECURE LATCHING SYSTEM

BACKGROUND OF THE INVENTION

FIELD OF THE INVENTION

The present invention relates generally to latching systems and more particularly to a system for securely latching a device in a support frame.

PRIOR ART

Various attempts have been made in the past to securely latch a device in a support frame with limited success. One way to latch a hand-held personal computing terminal (PCT) in a support frame is via a pair of oppositely disposed L-shaped latching members wherein each latching member is pivotally mounted on one side of the support frame. One end of each L-shaped latching member is equipped with a latch pin for engaging a corresponding latch recess on the side of the PCT with the opposite end being usually spring loaded. The support frame is normally provided on each side with an aperture disposed upstream from each pivotally mounted latching member to allow limited angular rotation of each L-shaped latching member about its pivot axis toward/away from the interior of the support frame during capture/release of the PCT. During capture, the front wall of a PCT being inserted in the support frame contacts the latch pins causing partial rotation of each latch pin against the spring restoring force. As the PCT continues to advance closer to the latch pivot axes (each spring is conventionally mounted downstream from each latch pivot axis), an audible "click" would indicate that the PCT latch recesses have engaged the respective latch pins capturing the hand-held PCT inside the support frame.

This type of latching, unfortunately, does not resist an accidental release of the captured PCT. Any pulling/removal force that can overcome the spring restoring forces would tend to rotate each latch pin out of its respective latch recess leading eventually to the unplanned release of the PCT, i.e. positive capture is directly dependent on the magnitude of the spring restoring force. The latching geometry itself is not designed to aid in securely capturing the PCT.

Therefore, the need arises for an improved latching system capable of securely capturing a device in a support frame without being directly dependent on the magnitude of the spring restoring force. Such a latching system should be capable of securely capturing a device by virtue of its latching geometry with the spring means playing only a complementary part.

SUMMARY OF THE INVENTION

The present invention is directed to a system for securely latching a device in a support frame. The system comprises at least one latching member adapted to pivot about at least one latch pivot axis defined on the support frame and to engage at least one corresponding latch recess on the device downstream from the latch pivot axis for latching the device in the support frame. The system also comprises at least one spring operatively coupled between the support frame and the latching member upstream from the latch pivot axis. The spring has a spring restoring force which causes the latching member to pivot toward the interior of the support frame to securely engage the corresponding latch recess on the device and to automatically pivot further toward the interior of the support frame within the engaged latch recess in case of an unplanned attempt to release the device from the support frame.

These and other aspects of the present invention will become apparent from a review of the accompanying drawings and the following detailed description of the preferred embodiments of the present invention.

BRIEF DESCRIPTION OF THE DRAWINGS

The invention is generally shown by way of example in the accompanying drawings in which:

FIG. 6A is a side plan view of a hand-held PCT being securely captured in the docking bay (support frame) of FIG. 1 in accordance with the present invention;

FIG. 6B is a sectional view taken along section line 6B—6B of FIG. 6A;

FIG. 7A is a side plan view of a hand-held PCT being conventionally latched in a support frame; and FIG. 7B is a sectional view taken along section line 7B—7B of FIG. 7A.

DETAILED DESCRIPTION OF THE PREFERRED EMBODIMENTS

Figure 1:
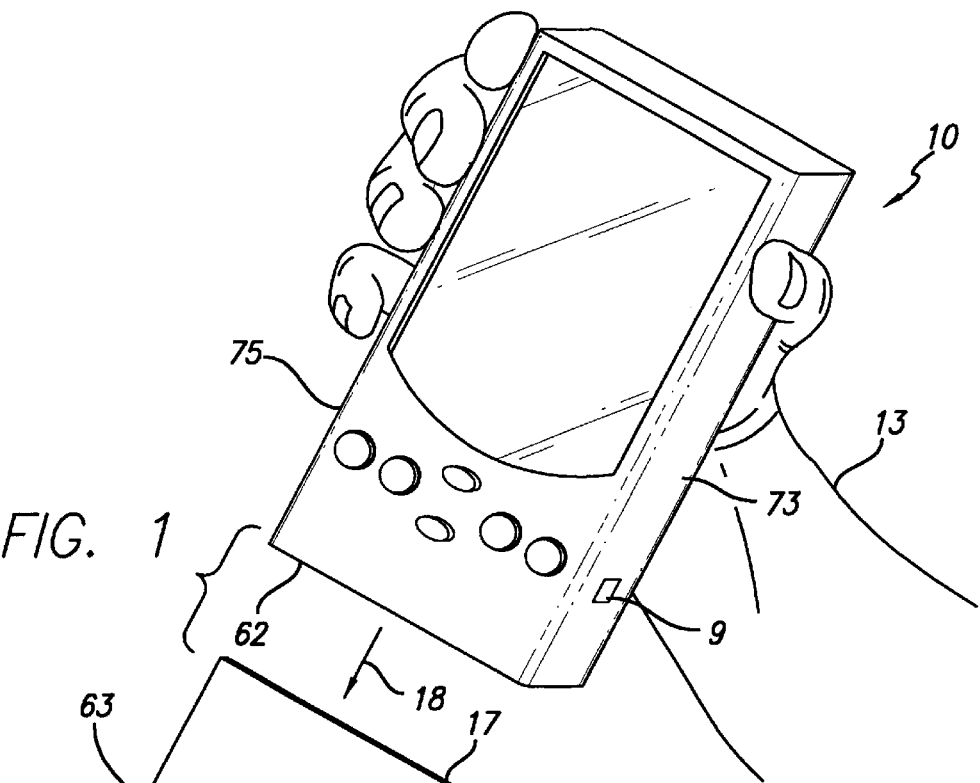
FIG. 1 is a side perspective view depicting a hand-held personal computing terminal (PCT) being inserted by a user into a docking bay (support frame) provided with a secure latching system in accordance with the present invention.

Hereinafter, some preferred embodiments of the present invention will be described in detail with reference to the related drawings of FIGS. 1–7B. Additional embodiments, features and/or advantages of the invention will become apparent from the ensuing description or may be learned by the practice of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

Figure 2:
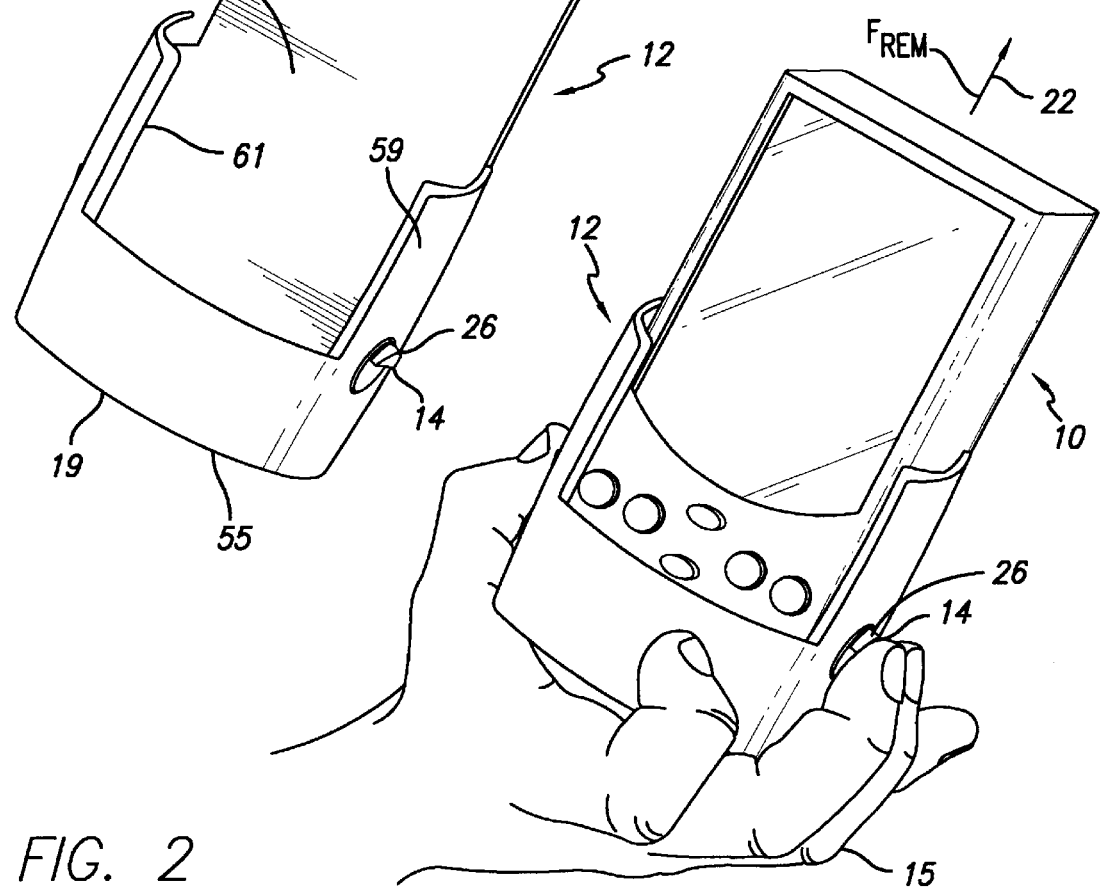
FIG. 2 is a side perspective view depicting the PCT of FIG. 1 in the process of being unlatched from the docking bay of FIG. 1 by the user in accordance with the present invention.

The present invention is directed to a system for securely capturing (latching) a device such as a hand-held personal computing terminal (PCT) 10 (FIG. 1) in a support frame or docking bay 12 (FIG. 1) which may be mounted on a portable image forming device such as a pistol-grip thermal transfer printer (not shown). Docking bay 12 has an open front portion 17 and a closed back portion 19 comprised of two generally parallel side walls 59, 61 joined by a back wall 55 defining a partially open interior 63 adapted to slidably receive PCT 10 (FIG. 1). As generally depicted in FIGS. 2 and 6B, a front 62 (FIG. 1), a first side 73 (FIG. 1) and a second side 75 (FIG. 1) of PCT 10 are preferably disposed in close proximity to back wall 55, side wall 59 and side wall 61, respectively, of docking bay 12 when PCT 10 is in a captured state, i.e. it is securely latched inside docking bay 12, to prevent undesirable lateral movement and/or translation of PCT 10 in a direction parallel to directional arrow 18 (FIG. 1).

Each side (73, 75) of PCT 10 is adapted to removably engage a respective latching member pivotally mounted on each side of docking bay 12. For example, first latching member 14 (FIGS. 1, 2, 6B) is pivotally mounted on side wall 59 of docking bay 12 and second latching member 16 (FIG. 6B) is pivotally mounted on side wall 61 of docking bay 12. PCT 10 may be slidably inserted by a user 13 into docking bay 12 in the direction of arrow 18 (FIG. 1) and securely latched (captured) by first and second latching members 14,16 in accordance with the general principles of the present invention. PCT 10 may be manually unlatched from docking bay 12 by a user 15 applying equal pressure on the protruding or button portion of each latching member (14, 16) at the same time as depicted in FIG. 2. The unlatched PCT 10 slides out of docking bay 12 in the direction of arrow 22 (FIG. 2).

Figure 5:
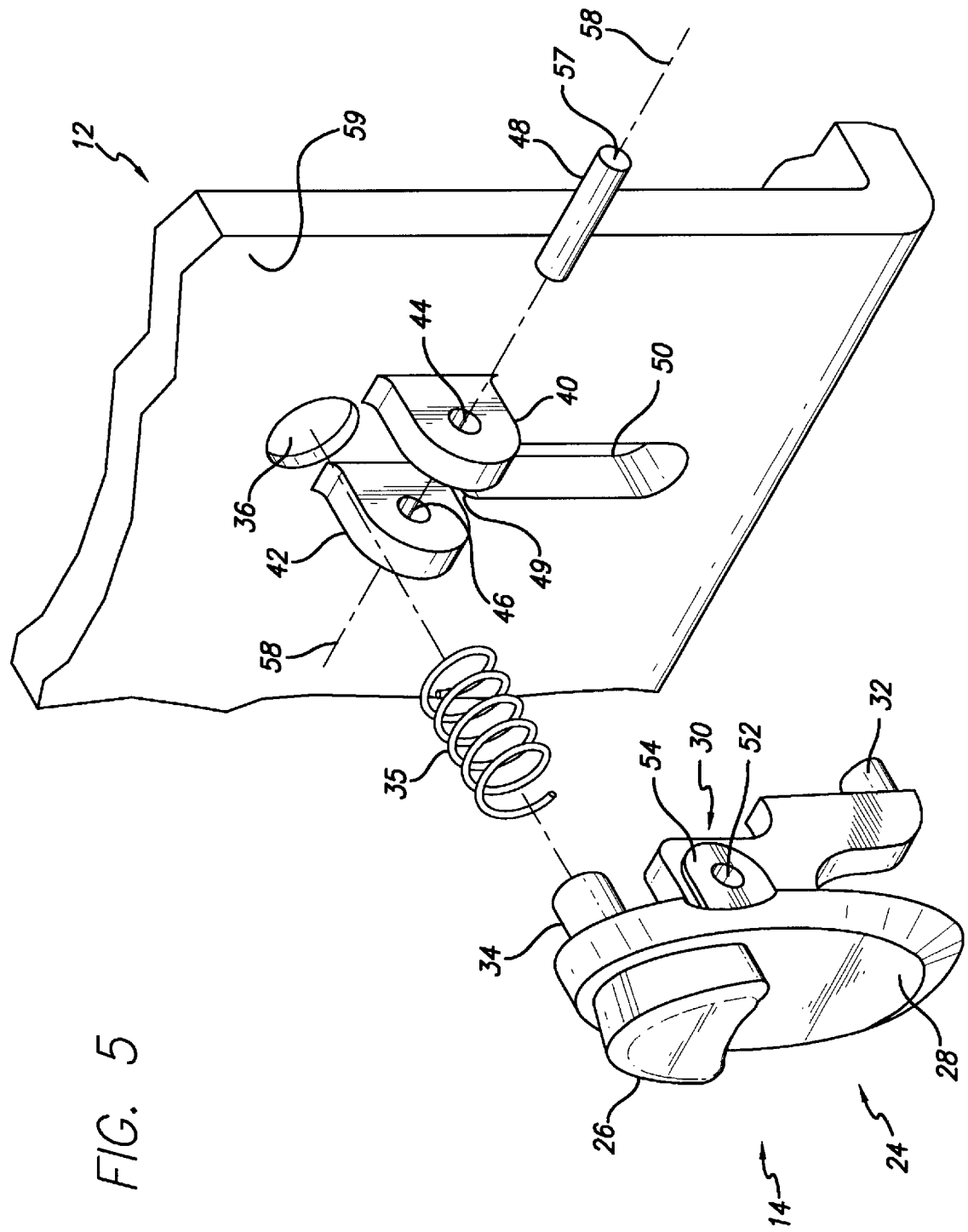
FIG. 5 is an exploded view of the various components of a latching member and docking bay (support frame) in accordance with the present invention.

In accordance with a preferred embodiment of the present invention, first latching member 14 comprises an oval top 24 which includes a protruding or button portion 26 at one end and a generally flat portion 28 at the other end disposed over an integral base 30, as generally illustrated in FIG. 5. Base 30 includes at one end a generally cylindrical latch pin 32 (FIG. 5) adapted to engage a corresponding latch recess 9 (FIG. 1) provided on first side 73 of PCT 10. Latch recess 9 is shaped to receive and hold latch pin 32 when PCT 10 is in a captured state. Oval top 24 is further provided (under button portion 26) with a generally cylindrical leg 34 which is inserted into a coiled steel compression spring 35 mounted between the underside of button portion 26 and a generally circular recess 36 on side wall 59 of docking bay 12 (FIG. 5).

Figure 3:
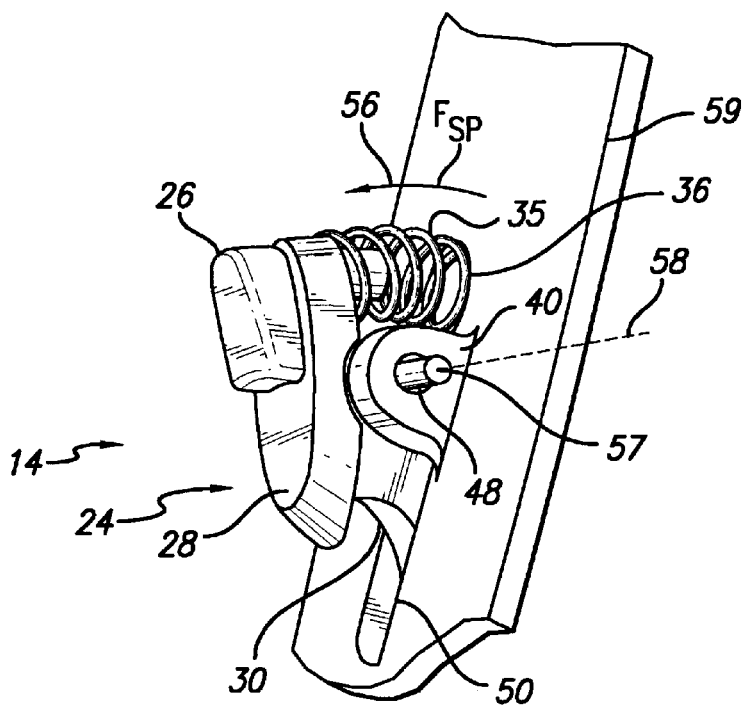
FIG. 3 is a detailed perspective view of a latching member mounted on the docking bay (support frame) of FIG. 1 in a "capturing" mode in accordance with the present invention.

Compression spring 35 has a spring restoring force, $F_{SP}$, pushing button portion 26 away from side wall 59 of docking bay 12 as shown by directional arrow 56 (FIG. 3). Various other means may be employed to spring-load first latching member 14 as long as such other means do not depart from the intended purpose of the present invention. For example, a torsional spring may be used or the spring may be made an integral part of first latching member 14 to reduce cost. Second latching member 16 (FIG. 6B) essentially has the same construction and function as first latching member 14.

Side wall 59 of docking bay 12 is also provided with a pair of integral generally arc-shaped latch mounting arms 40, 42 (FIG. 5) disposed opposite each other between circular recess 36 and a generally oblong aperture 50 (on side wall 59) adapted to provide latch pin access (through the support frame) to interior 63 of docking bay 12 for first latching member 14. Latch mounting arms 40, 42 are generally parallel to each other with each arm centrally provided with a generally circular aperture (44, 46) for receiving a cylindrical latch pivot pin 48 (FIG. 5) therethrough. Side wall 61 of docking bay 12 is configured essentially in the same manner (not shown) as described hereinabove in reference to side wall 59.

Figure 4:
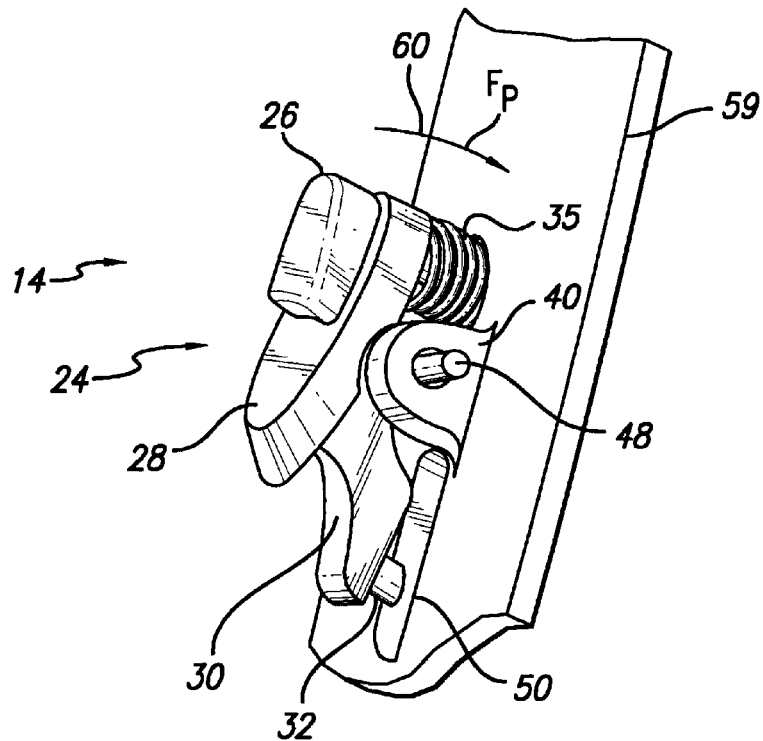
FIG. 4 is a detailed perspective view of a latching member mounted on the docking bay (support frame) of FIG. 1 in a "releasing" mode in accordance with the present invention.

Base 30 is pivotally mounted on side wall 59 of docking bay 12 via a rear portion 54 (FIG. 5) which is provided with a generally circular aperture 52 (FIG. 5) adapted to slidably receive pivot pin 48. Rear portion 54 is adapted to fit in between parallel latch mounting arms 40, 42 whereby latch pivot pin 48 is threaded through apertures 44, 52 and 46, respectively. An assembled and pivotally mounted first latching member 14 is generally illustrated in FIGS. 3–4. Specifically, FIG. 3 depicts first latching member 14 generally in a "capturing" mode, while FIG. 4 depicts first latching member 14 generally in a "releasing" mode. Second latching member 16 is similarly assembled and mounted on side wall 61 of docking bay 12 via a latch pivot pin 51 (FIG. 6B).

Aperture 50 (on side wall 59) has a first edge 49 (FIGS. 5, 6B) adapted to serve as a corner stop for pivotally mounted base portion 30 of first latching member 14. On the opposite side (of docking bay 12), a first edge 47 of a generally oblong aperture 45 on side wall 61 serves, respectively, as a corner stop for second latching member 16. Second latching member 16 is also provided with a latch pin 31 at one end as depicted in FIG. 6B.

As generally shown in FIGS. 3–4, spring-loaded latching member 14 is adapted to rotate in a limited angular fashion about a latch pivot axis 58, defined along a longitudinal axis 57 of latch pivot pin 48. To unlatch PCT 10 from docking bay 12, user 15 must push simultaneously on the button portion of each latching member 26 (FIG. 2). The pushing force, $F_P$, supplied by user 15, acts generally in a direction opposite $F_{SP}$, i.e. toward side wall 59 of docking bay 12, as shown by directional arrow 60 in FIG. 4, and toward side wall 61 of docking bay 12 (FIG. 6B). To unlatch PCT 10 from docking bay 12, user 15 must apply simultaneously an equal amount of force $F_P$ on the button portion of each latching member which is sufficient to overcome each $F_{SP}$ and rotate each latch pin (31, 32) completely out of its respective latch recess (9, 11) as generally depicted in FIG. 2.

The above-described components may be made of plastic, metal or any other suitable material as long as such material falls within the scope of the present invention.

In accordance with a preferred embodiment of the present invention and as generally illustrated in FIGS. 6A–6B, PCT 10 is securely captured (or latched) in docking bay 12 in two steps as follows:

Step 1. Latch pins 31, 32 are partially pushed away from interior 63 by the advancing corners of front 62 of PCT 10 causing a corresponding partial rotation of second latching member 16 about latch pivot axis 53 in a direction D1' (FIG. 6B) and of first latching member 14 about latch pivot axis 58 in a direction $D_1$ (FIG. 6B).

Step 2. As soon as PCT 10 is in a proper docking position—latch recess 9 momentarily lined up with latch pin 32 and latch recess 11 momentarily lined up with latch pin 31—latch pins 31, 32 audibly "click" into place being forced by their respective spring restoring forces (which act in a positive or locking direction) to engage latch recesses 11, 9, respectively. Positive capture of PCT 10 in docking bay 12 under the action of each $F_{SP}$ involves simultaneous partial rotation of first latching member 14 in a direction $D_2$ (opposite $D_1$) and second latching member 16 in a direction $D_2'$ (opposite $D_1'$) resulting in latch pin 32 being securely engaged in latch recess 9 on PCT 10 and latch pin 31 being securely engaged in latch recess 11 on PCT 10 (FIG. 6B).

A person skilled in the art would readily recognize that the above-described novel latching system geometry inherently resists undesirable (accidental) release of latched (captured) PCT 10. Specifically, any accidental or unplanned pulling/removal force $F_{REM}$ acting generally in the direction of arrow 22, FIG. 2 which is sufficient to overcome both spring restoring forces will automatically cause further rotation of first and second latching members 14, 16 (about pivot axes 58, 53) toward interior 63 (FIG. 1) of docking bay 12 (in directions $D_2$ and $D_2'$, respectively), essentially enhancing the spring restoring force, $F_{SP}$, of each compression spring (35, 33). This would result in (engaged) latch pins 32, 31 being rotated further inside latch recesses 9, 11, respectively, clamping PCT 10 even tighter on each side. In fact, as soon as latch pins 31, 32 are engaged ("clicked" into place) inside latch recesses 11, 9 (of PCT 10), the only way PCT 10 may be unlatched without breaking first and second latching members 14, 16, and/or docking bay 12, and/or PCT 10 itself, is if user 15 pushes simultaneously on the button portion of each latching member (14, 16) with an equal force $F_P$ which is sufficient to overcome both spring restoring forces and rotate latch pins 32, 31 completely out of their respective latch recesses 9, 11. Positive capture of PCT 10 is, therefore, not directly dependent on the magnitude of the spring restoring force, $F_{SP}$, at all.

Each compression spring (35, 33) is preferably chosen with a restoring force, $F_{SP}$, which is at least (a) sufficient to automatically guide (rotate) latch pin 32 or 31, respectively, into place (i.e., inside latch recesses 9, 11) during capture, (b) sufficient to help keep each latch pin (32, 31) securely engaged in its respective latch recess (9, 11) after capture, and (c) sufficient to ensure proper direction of rotation of each latching member (14, 16) during latching/unlatching, i.e. toward or away from interior 63 of docking bay 12. The magnitude of $F_{SP}$ will vary depending on the particular application and geometry involved.

A person skilled in the art would readily recognize that the above-described novel latching geometry—latch pin disposed downstream from the latch pivot axis, spring means mounted upstream from the latch pivot axis—represents a major departure from conventional latching systems. One conventional latching system, generally illustrated in FIGS. 7A–7B, captures a hand-held PCT 66 in a support frame 68 which has pivotally mounted (and oppositely disposed) latching members 74, 76. Latching member 74 includes a generally L-shaped body 78 having a latch pin 80 at a front end for engaging a corresponding latch recess 70 on PCT 66. L-shaped body 78 is spring-loaded at a back end via a compression spring 82. Spring 82 has a spring restoring force, $F'_{SP}$, acting in the direction of arrow $M_1$ and is coupled between a side wall 84 of support frame 68 and the underside of L-shaped body 78 (FIG. 7B). L-shaped body 78 is pivotally mounted on a side wall 84 of support frame 68 via a latch pivot pin 86 and is capable of limited angular rotation about a latch pivot axis 89 defined along the longitudinal axis of latch pivot pin 86 as depicted generally in FIG. 7B.

In a similar fashion, latching member 76 includes a generally L-shaped body 79 provided with a latch pin 81 at a front end for engaging a corresponding latch recess 72 on PCT 66. L-shaped body 79 is spring-loaded at a back end by way of a compression spring 83. Spring 83 has a restoring force, $F'_{SP}$, acting in the direction of arrow $M'_1$ and is coupled between a side wall 85 of support frame 68 and the underside of L-shaped body 79 (FIG. 7B). L-shaped body 79 is pivotally mounted on a side wall 85 of support frame 68 via a latch pivot pin 87 and is capable of limited angular rotation about a latch pivot axis 91 defined along the longitudinal axis of latch pivot pin 87 (FIG. 7B).

Each side of support frame 68 is provided with an aperture (100, 102) disposed upstream from a respective latch pivot axis (FIG. 7B) and adapted to allow the front end of each latching member (74, 76) to rotate toward/away from the interior of support frame 68 for latching/unlatching PCT 66.

Such latching geometry, in which the latch pin engages/disengages a respective latch recess (on PCT 66) upstream from the latch pivot axis and the spring means is mounted downstream from the latch pivot axis, generally does not resist the unplanned (accidental) release of captured PCT 66 from support frame 68. Clearly, any accidental pulling/removal force, $F'_{REM}$, on PCT 66, acting generally in the direction of arrow 90 (FIG. 7B), which is sufficient to overcome both spring restoring forces will cause a corresponding (undesirable) partial rotation of each latching member (74, 76) about its respective latch pivot axis in the direction of arrows $M_2$, $M'_2$, respectively. Such partial rotation may cause latch pins 80, 81 to disengage from their respective latch recesses (70, 72) and thereby accidentally release PCT 66 from support frame 68. Such a release may occur, for example, if the user were to hold and swing support frame 68 (containing a captured PCT) with great angular acceleration. In fact, any translation of captured PCT 66 in direction 90 (FIG. 7B) will impart a force through latch recesses 70, 72 of PCT 66 to latch pins 80, 81, respectively, which may cause latch pins 80, 81 to rotate completely out of latch recesses 70, 72, respectively. Obviously, positive capture in this conventional latching geometry is directly dependent on the magnitude of each compression spring restoring force, $F'_{SP}$.

No such requirement is inherent in the above-described novel latching geometry. Furthermore, positive capture in the latching setup of FIGS. 7A–7B is not only not helped or ensured at all by its latching geometry, but is in fact degraded. The conventional latching geometry of FIGS. 7A–7B is, essentially, reversed if compared with the novel latching system geometry of FIGS. 6A–6B, and as such provides generally an unstable latching arrangement.

It should be appreciated by a person skilled in the art that other components and/or configurations may be utilized in the above-described embodiments, provided that such components and/or configurations do not depart from the intended purpose and scope of the present invention.

The above-described novel latching system fully meets the needs of the prior art and may be used in a variety of applications such as for latching cameras, GPS units, bar-code scanners, personal digital assistants (PDAs) to other devices, or in heavy machinery such as for mining, etc.

While the present invention has been described in detail with regards to the preferred embodiments, it should also be appreciated that various modifications and variations may be made without departing from the scope or spirit of the invention. For example, depending on the needs of the user, the latching system of the present invention may be modified to eliminate second latching member 16, i.e., to include only first latching member 14. In this case, first latching member 14 would generally function as described hereinabove, providing side wall 61 (which is now continuous—no aperture) of docking bay 12 is disposed in close proximity to second side 75 of PCT 10 when PCT 10 latched inside docking bay 12 to prevent undesirable lateral PCT movement. Alternatively, the novel secure latching system may be modified to operate with more than two oppositely disposed latching members, each configured generally to function as described hereinabove (not shown).

It is important to note that practicing the invention is not limited to the applications described hereinabove. Many other applications and/or alterations may be utilized provided that such other applications and/or alterations do not depart from the intended purpose of the present invention.

It should further be appreciated by a person skilled in the art that features illustrated or described as part of one embodiment can be used in another embodiment to provide yet another embodiment such that the features are not limited to the specific embodiments described above. Thus, it is intended that the present invention cover all such modifications, embodiments and variations as long as such modifications, embodiments and variations come within the scope of the appended claims and their equivalents.

What is claimed is:

1. A system for securely latching a device in a support frame, the device being removable from the frame in an upstream direction and insertable into the frame in a downstream direction, said system comprising:

at least one latching member having a release button projecting outwardly from a sidewall of the support frame, said sidewall being generally oriented parallel to said upstream and downstream directions; said at least one latching member being adapted to pivot about a corresponding latch pivot axis defined on an exterior portion of said support frame parallel to said sidewall, said latching member having a latch pin downstream from said latch pivot axis for latching said device in said support frame, said latch pin extending upwardly and inwardly into an interior of said support frame for removably engaging a corresponding latch recess on said device downstream from said latch pivot axis; and at least one spring operatively coupled between said support frame and the release button of said latching member, upstream from said latch pivot axis and having a spring restoring force causing the latch pin to rotate upwardly and inwardly toward the interior of said support frame to securely engage said corresponding latch recess, wherein said latch pin of the latching member is arranged to automatically rotate further upwardly and inwardly into the interior of said latch recess in response to a removal force being applied to the device generally in said upstream direction while the latch pin is still engaged within the latch recess, and to thereby enhance said spring restoring force to provide a clamping force sufficient to overcome said removal force, such that the device may not be removed from the frame without damage to the latching member, the frame, or the device.

2. The system of claim 1, wherein said at least one latching member comprises a base pivotally coupled to said support frame for rotation about said latch pivot axis, said base being integrally formed with said latch pin.

3. The system of claim 2, wherein said release button is integrally formed with said base.

4. The system of claim 2, wherein said support frame includes at least one aperture disposed downstream from said latch pivot axis and adapted to allow said latch pin to engage said latch recess on said device through said support frame.

5. The system of claim 4, wherein at least one edge of said at least one aperture serves as a corner stop for said pivotally coupled base.

6. A system for securely latching a device in a support frame the device being removable from the frame in an upstream direction and insertable into the frame in a downstream direction, said system comprising:

(a) a first latching member adapted to pivot about a first latch pivot axis defined on an exterior side portion of said support frame and having a first latch pin adapted to engage a corresponding first latch recess on said device downstream from said first latch pivot axis for latching a first side of said device in said support frame;

(b) a second latching member adapted to pivot about a second latch pivot axis defined on an opposite exterior side portion of said support frame and having a second latch pin adapted to engage a corresponding second latch recess on said device downstream from said second latch pivot axis for latching a second side of said device in said support frame;

(c) a first spring operatively coupled between said support frame and said first latching member upstream from said first latch pivot axis and having a first spring restoring force causing said first latch pin to pivot upwardly and inwardly into the interior of said support frame to securely engage said first latch recess; and (d) a second spring operatively coupled between said support frame and said second latching member upstream from said second latch pivot axis and having a second spring restoring force causing said second latch pin to pivot upwardly and inwardly into the interior of said support frame to securely engage said second latch recess, wherein said respective first and second latch pins are arranged to automatically rotate further into the respective interiors of said first and second latch recesses in case of an unplanned attempt to release said device from said support frame and thereby more securely engage the device in response to a removal force being applied to the device generally in said upstream direction while the first and second latch pins are still engaged within the latch recesses, and to thereby enhance said spring restoring forces to provide clamping forces sufficient to overcome said removal force, such that the device may not be removed from the frame without damage to the latching members, the frame, or the device.

7. The system of claim 6, wherein said first latching member comprises a first base pivotally coupled to said support frame for rotation about said first latch pivot axis, said first latch pin being disposed on a downstream portion of said first base.

8. The system of claim 7, wherein said second latching member comprises a second base pivotally coupled to said support frame substantially opposite said first base for rotation about said second latch pivot axis, said second latch pin being disposed on a downstream portion of said second base.

9. The system of claim 8, wherein each of said first and second latching members further comprises a respective button portion disposed over said respective first and second bases for pushing against said respective first and second spring restoring forces to unlatch said device from said support frame.

10. The system of claim 8, wherein said support frame includes a first aperture disposed downstream from said first latch pivot axis and adapted to allow said first latch pin to engage said first latch recess on said device through said support frame.

11. The system of claim 10, wherein said support frame further includes a second aperture disposed downstream from said second latch pivot axis and adapted to allow said second latch pin to engage said second latch recess on said device through said support frame.

12. The system of claim 11, wherein at least one edge of said first aperture serves as a corner stop for said first pivotally coupled base.

13. The system of claim 12, wherein at least one edge of said second aperture serves as a corner stop for said second pivotally coupled base.

* * * * *